US009292050B2

(12) United States Patent
Noguchi et al.

(10) Patent No.: US 9,292,050 B2
(45) Date of Patent: Mar. 22, 2016

(54) DETACHABLE ELECTRONIC DEVICE WITH COVER PORTION

(71) Applicant: Lenovo (Singapore) Pte. Ltd., Singapore (SG)

(72) Inventors: Hiroyuki Noguchi, Kanagawa-ken (JP); Eiji Shinohara, Kanagawa-ken (JP); Kazuo Nakada, Kanagawa-ken (JP); Tomoyuki Takahashi, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 207 days.

(21) Appl. No.: 14/075,743

(22) Filed: Nov. 8, 2013

(65) Prior Publication Data

US 2014/0133079 A1 May 15, 2014

(30) Foreign Application Priority Data

Nov. 9, 2012 (JP) ................................. 2012-247573

(51) Int. Cl.
*G06F 1/16* (2006.01)

(52) U.S. Cl.
CPC ............ *G06F 1/1681* (2013.01); *G06F 1/1616* (2013.01); *G06F 1/1654* (2013.01)

(58) Field of Classification Search
CPC ............................. G06F 1/1626; G06F 1/1643
USPC ..................................................... 361/679.29
See application file for complete search history.

(56) References Cited

U.S. PATENT DOCUMENTS

| | | | |
|---|---|---|---|
| 6,690,353 B2 * | 2/2004 | Chang ........................... | 345/156 |
| 6,937,468 B2 * | 8/2005 | Lin et al. ................... | 361/679.41 |
| 8,873,227 B2 * | 10/2014 | Whitt et al. .............. | 361/679.09 |
| 2002/0171020 A1 * | 11/2002 | Huang et al. ............. | 248/346.01 |
| 2006/0067036 A1 * | 3/2006 | Lin et al. ........................ | 361/681 |
| 2007/0047197 A1 * | 3/2007 | Kobayashi et al. ........... | 361/685 |
| 2007/0091552 A1 * | 4/2007 | Liang et al. ................... | 361/681 |
| 2010/0172081 A1 * | 7/2010 | Tian et al. ................ | 361/679.29 |
| 2012/0051013 A1 * | 3/2012 | Chao ............................ | 361/755 |
| 2013/0170126 A1 * | 7/2013 | Lee .......................... | 361/679.17 |

FOREIGN PATENT DOCUMENTS

| | | |
|---|---|---|
| JP | S617971 A | 1/1986 |
| JP | H05330177 A | 12/1993 |
| JP | H08135269 A | 5/1996 |
| JP | 2005158013 A | 6/2005 |

* cited by examiner

*Primary Examiner* — Anthony Q Edwards
(74) *Attorney, Agent, or Firm* — Ference & Associates LLC

(57) ABSTRACT

An embodiment provides an electronic device, including: a detachable display portion; a base body; the base body including an attachment portion to which the detachable display portion attaches; the attachment portion being located a depth from a rear edge of the base body; and a cover extending from a point of the base body behind the attachment portion and proximate to the rear edge of the base body.

10 Claims, 9 Drawing Sheets

DETACHABLE ELECTRONIC DEVICE WITH COVER PORTION

CLAIM FOR PRIORITY

This application claims priority from Japanese Patent Application No. 2012-247573, filed on Nov. 9, 2012, and which is fully incorporated by reference as if fully set forth herein.

BACKGROUND

With regard to an electronic device including an opening and closing body that is heavier than a base body, such as a laptop PC in which a tablet PC is attached to a station, if a shaft for supporting the opening and closing body is placed on a back end of the base body, like a conventional laptop PC, the electronic device turns over on an opening-and-closing-body side when the opening and closing body is opened. In view of this, the shaft for supporting the opening and closing body is placed on the base body so that a depth of the base body remains behind the shaft (see, for example, Japanese Patent Application Laid-Open No. 2005-158013).

BRIEF SUMMARY

In summary, one aspect provides an electronic device, comprising: a detachable display portion; a base body; the base body including an attachment portion to which the detachable display portion attaches; the attachment portion being located a depth from a rear edge of the base body; and a cover extending from a point of the base body behind the attachment portion and proximate to the rear edge of the base body.

Another aspect provides an electronic device, comprising: a base body that contains a shaft for attaching to a detachable display portion, wherein the a depth of the base body remains behind the shaft; and an opening and closing body with an outer surface that is attached to the base body; wherein the shaft supports the opening and closing body to allow it to be openable and closable with respect to the base body; and wherein the opening and closing body covers the depth of the base body and remains behind the shaft when the shaft is in a closed position with respect to the base body.

A further aspect provides An electronic device, comprising: a base body that contains a movable shaft for attaching to a detachable tablet portion, wherein the a depth of the base body remains behind the shaft; and a cover that attaches to the base body and transitions when the shaft is moved; wherein the base body contains a stepped portion between the shaft and a rear edge of the base body accommodating opening and closing of the shaft with respect to the base body; and wherein the cover is positioned and shaped to cover the rear edge of the base body when the shaft and is closed with respect to the base body.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims

DETAILED DESCRIPTION

Figure 1:
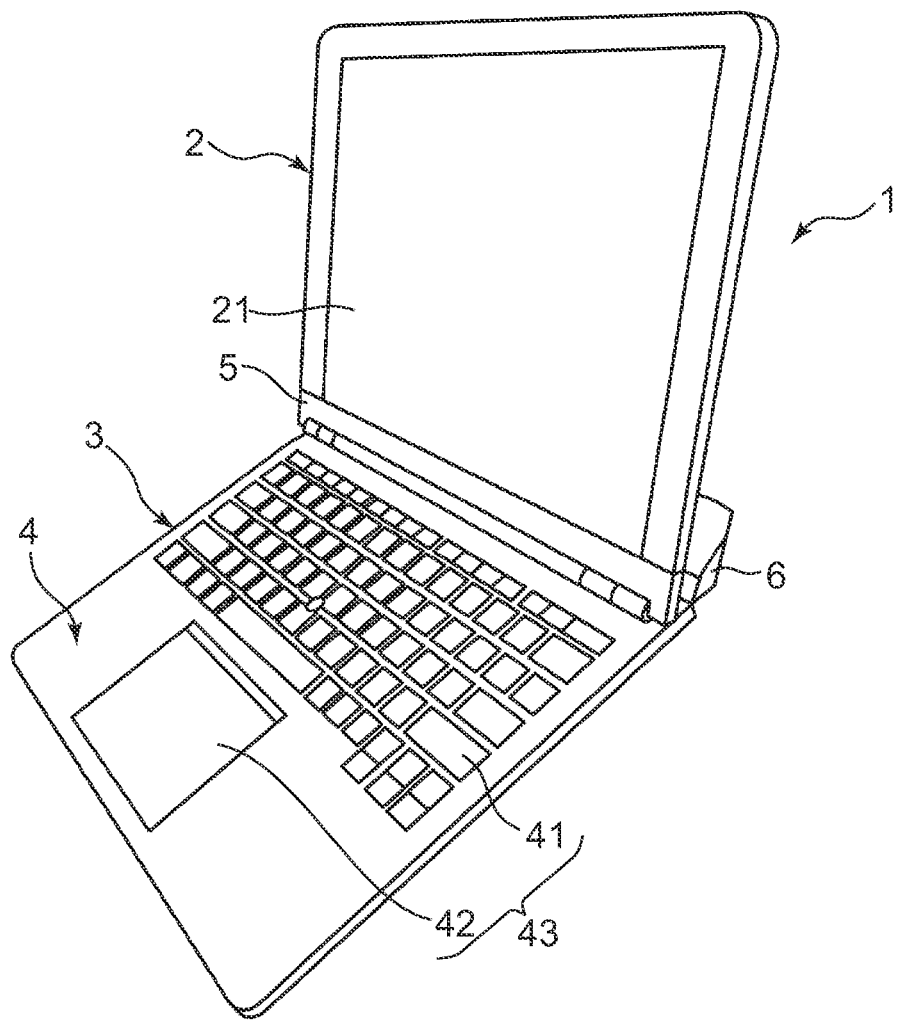
FIG. 1 shows a perspective view illustrating a laptop PC according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

With regard to an electronic device including an opening and closing body that is heavier than a base body, if the shaft for supporting the opening and closing body is placed on the base body so that the depth of the base body remains behind the shaft, it is necessary to provide a movable range for the opening and closing body in an area of the base body which area is further backward than the shaft. This causes a step or a V-shaped groove to remain between the base body and the opening and closing body when the opening and closing body is closed, which impairs an appearance of the electronic device.

An embodiment addresses the above problem and improves an appearance at the time of closing an opening and closing body of an electronic device in which a shaft for supporting the opening and closing body is placed on a base body so that a depth remains behind the shaft.

An embodiment is characterized by an electronic device in which a shaft for supporting an opening and closing body provided to be openable and closable with respect to a base body is placed on the base body so that a depth of the base body remains behind the shaft, which electronic device includes a cover which is supported behind the shaft, which is openable and closable when the opening and closing body is closed, which is configured such that its outer surface is placed on the same plane as an outer surface of the opening and closing body when the cover is closed, and which covers that depth portion of the base body which remains behind the shaft.

Another embodiment is characterized in that the cover is supported by a cover shaft provided behind the shaft in the aforementioned embodiment.

Another embodiment is characterized in that the cover is supported by the cover shaft so that the cover is removed from the cover shaft when a force of more than a predetermined magnitude works on the cover in a state where the cover is opened, in the aforementioned embodiment.

Another embodiment is characterized by including an opening and closing mechanism provided between the opening and closing body and the cover and configured to open the cover being closed, when the opening and closing body is opened from its closed state, in the aforementioned embodiment.

Another embodiment is characterized in that the opening and closing mechanism includes a link mechanism supported by the opening and closing body and the base body and configured to open the cover being closed, by pressing the cover thus closed, when the opening and closing body is opened from the closed state, in the aforementioned embodiment.

Another embodiment is characterized in that the opening and closing mechanism includes connection means for closing the cover when the opening and closing body is closed from its opened state, in the aforementioned embodiment.

Another embodiment is characterized in that the connection means includes a metal tabular body constituting the link mechanism and a magnet provided in the cover so as to be opposed to the tabular body, in the aforementioned embodiment.

Another embodiment is characterized in that a hitch to which a security lock is connected is provided in the depth portion of the base body which remains behind the shaft so that the hitch is drawable, in the aforementioned embodiment.

Another embodiment is characterized in that the opening and closing body is constituted by a base portion supported by the shaft and a tablet electronic device provided on the base portion, in the aforementioned embodiment.

An electronic device according to an embodiment includes a cover which is supported behind a shaft, which is openable and closable when an opening and closing body is closed, which is configured such that its outer surface is placed on the same plane as an outer surface of the opening and closing body when the cover is closed, and which covers that depth portion of a base body which remains behind the shaft. This makes it possible to improve an appearance at the time of closing the opening and closing body of the electronic device in which the shaft is placed on the base body.

An embodiment of an electronic device according to an embodiment will be hereinafter described in detail with reference to attached drawings. The following deals with a laptop PC in which a tablet PC is attached to a station, as an example, but the embodiments are not limited to the laptop PC in which the tablet PC is attached to the station.

Figure 2:
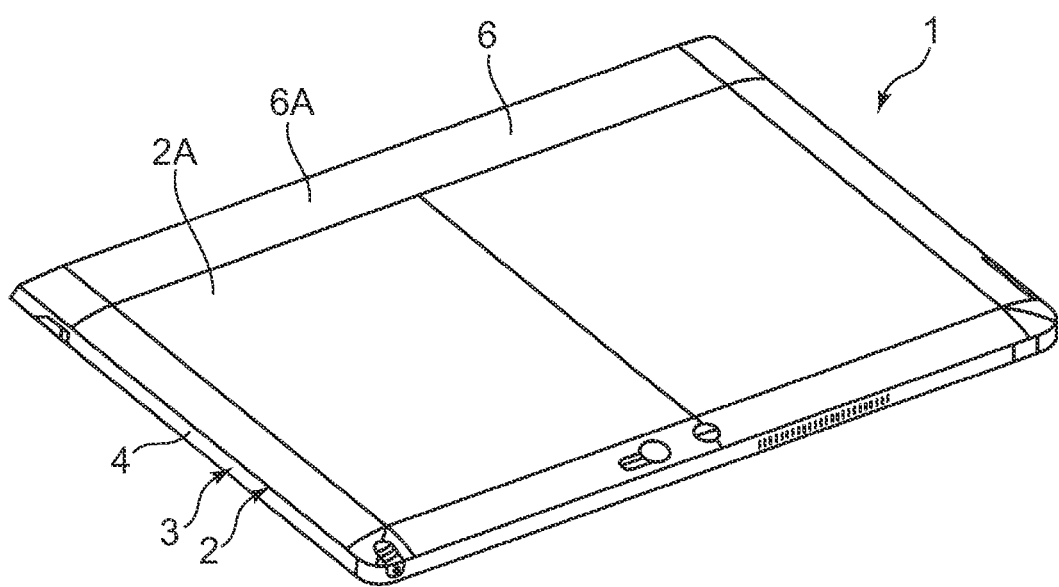
FIG. 2 shows a perspective view illustrating a state where an opening and closing body of the laptop PC illustrated in FIG. 1 is closed.
Figure 3:
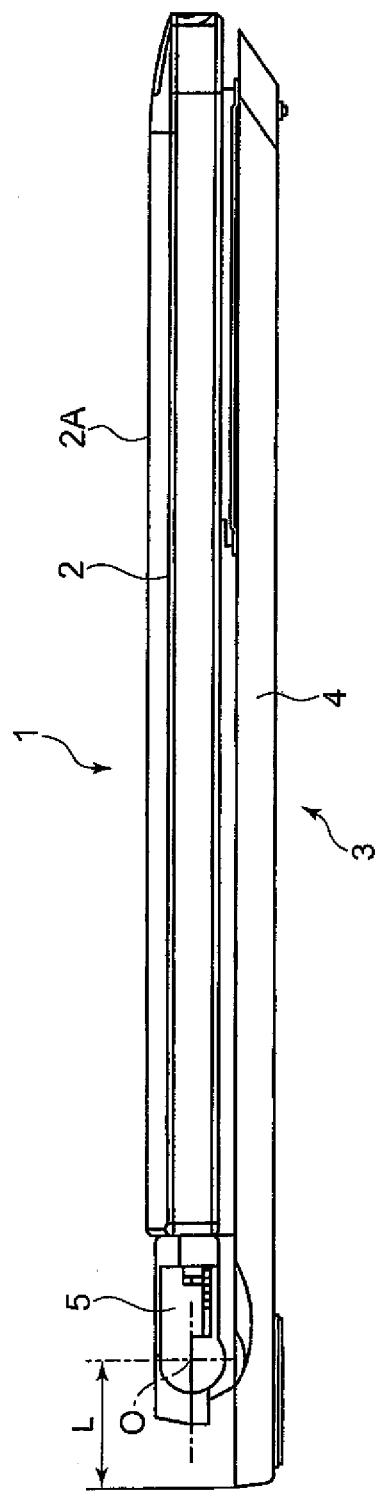
FIG. 3 shows a side view illustrating the state where the opening and closing body of the laptop PC illustrated in FIG. 1 is closed, in which a cover is omitted.

FIG. 1 is a perspective view illustrating a laptop PC according to an embodiment, and FIG. 2 is a perspective view illustrating a state where an opening and closing body of the laptop PC illustrated in FIG. 1 is closed. Further, FIG. 3 is a side view illustrating the state where the opening and closing body of the laptop PC illustrated in FIG. 1 is closed, in which side view a cover is omitted.

As illustrated in FIGS. 1 and 2, a laptop PC 1 according to an embodiment is configured such that a tablet PC 2 is attached to a station 3.

Since the tablet PC 2 is used solely, the tablet PC 2 is provided with a control board (not shown), a battery (not shown), and so on as well as a display 21, and is larger in weight than a cover of a conventional laptop PC.

As illustrated in FIG. 1, the station 3 includes a station body 4, and an attachment portion 5 to which the tablet PC 2 is attached. The station body 4 is a portion which is placed on a desk or a knee at the time of use and serves as a base body, and the attachment portion 5 is a portion to which the tablet PC 2 is attached, and the attachment portion 5 and the tablet PC 2 serve as an opening and closing body provided to be openable and closable with respect to the base body.

The station body 4 includes a keyboard 43 constituted by an operation key 41 and a touch pad 42 and provided on a top face thereon, and the attachment portion 5 includes a connector (not shown) to be connected to the tablet PC 2. Hereby, the keyboard 43 provided on the top face of the station body 4 strengthens an input function of the tablet PC 2 attached to the attachment portion 5.

As illustrated in FIG. 3, the attachment portion 5 is attached to the station body 4 rotatably, and a shaft (only a "shaft center O" of the shaft is illustrated) for rotatably supporting the attachment portion 5 is placed on the station body 4 so that a depth L of the station body 4 remains behind the shaft. Thus, the laptop PC 1 according to the present embodiment is configured as an electronic device in which a shaft provided to be openable and closable with respect to a base body is placed on the base body so that a depth of the base body remains behind the shaft.

In the laptop PC 1 in which the shaft is placed on the station body 4 so that the depth L of the station body 4 remains behind the shaft as such, even if the tablet PC 2 thus attached is larger in weight than the cover of the conventional laptop PC, the tablet PC 2 is supported by an area (the depth L) behind the shaft, so that the laptop PC 1 does not turn over on a tablet-PC-2 side.

FIGS. 4 to 7 are expanded sectional views each illustrating an essential part of the laptop PC illustrated in FIG. 1. As illustrated in FIGS. 4 to 7, a stepped portion 44 is provided on the top face of the station body 4 and behind the shaft (only the "shaft center O" of the shaft is illustrated). The stepped portion 44 is configured to prevent a step from occurring between the station body 4 and the attachment portion 5 when the tablet PC 2 is closed with respect to the station body 4, and includes an inclined surface 44a provided on a shaft side. The inclined surface 44a is configured to form a space where the attachment portion 5 rotates. An inclination angle of the inclined surface 44a defines an openable angle of the tablet PC 2, and when the tablet PC 2 is closed with respect to the station body 4, a V-shaped groove (space) G is caused between the inclined surface 44a and the attachment portion 5. In the present embodiment, the openable angle of the tablet PC 2 is defined to 135 degrees, so that the tablet PC 2 is openable by any degree between 0 degrees to 135 degrees with respect to the station body 4.

As illustrated in FIG. 2, a cover 6 made from resin is provided at a back side on the top face of the station body 4. The cover 6 is configured to cover a depth portion remaining behind the shaft. The cover 6 has a size that covers the depth portion remaining behind the shaft, namely, the stepped portion 44 and the V-shaped groove G, and the attachment portion 5, and a thickness that allows an outer surface 6A to be placed on the same plane as an outer surface 2A of the tablet PC 2 when the cover 6 covers the depth portion remaining behind the shaft.

Figure 4:
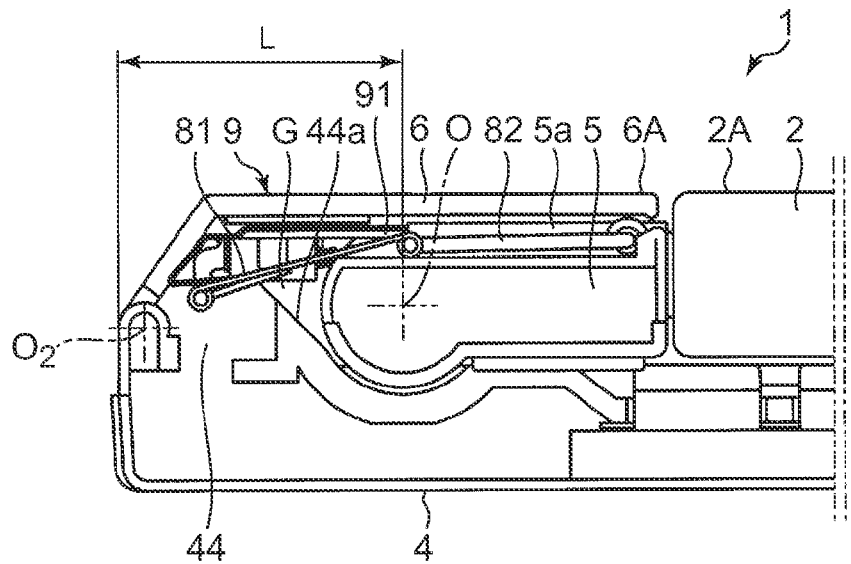
FIG. 4 shows an expanded sectional view illustrating an essential part of the laptop PC illustrated in FIG. 1, and illustrates a state where the opening and closing body is closed with respect to a base body.
Figure 6:
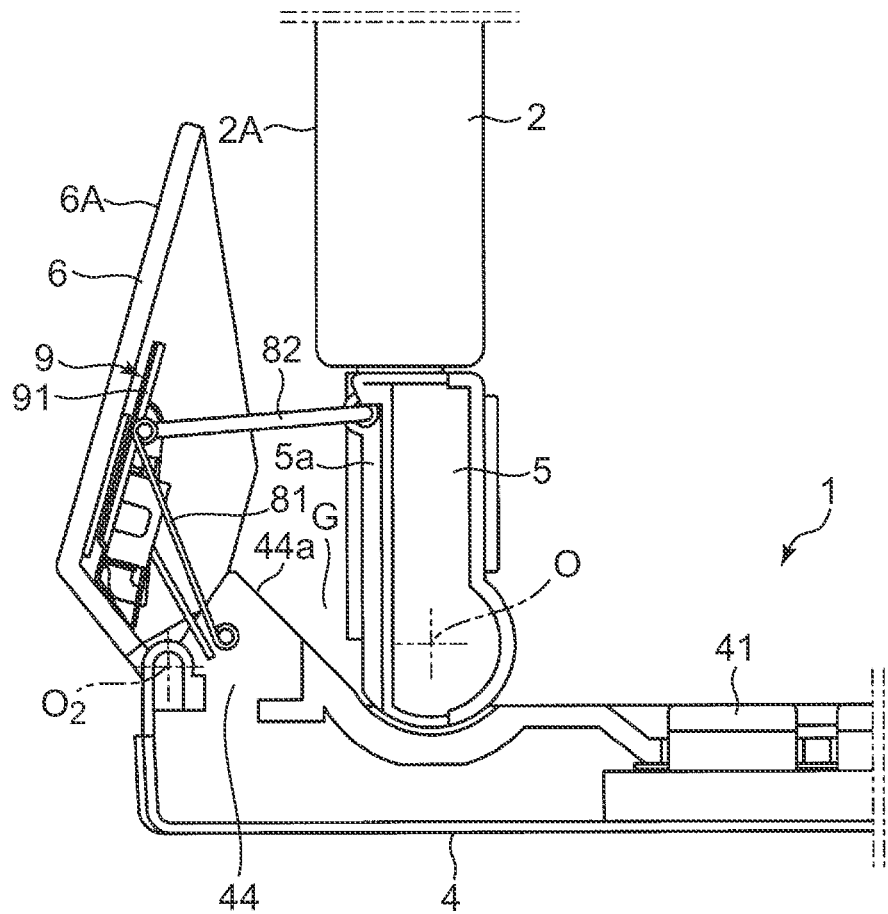
FIG. 6 shows an expanded sectional view illustrating an essential part of the laptop PC illustrated in FIG. 1, and illustrates a state where the opening and closing body is opened by 90 degrees with respect to the base body.
Figure 7:
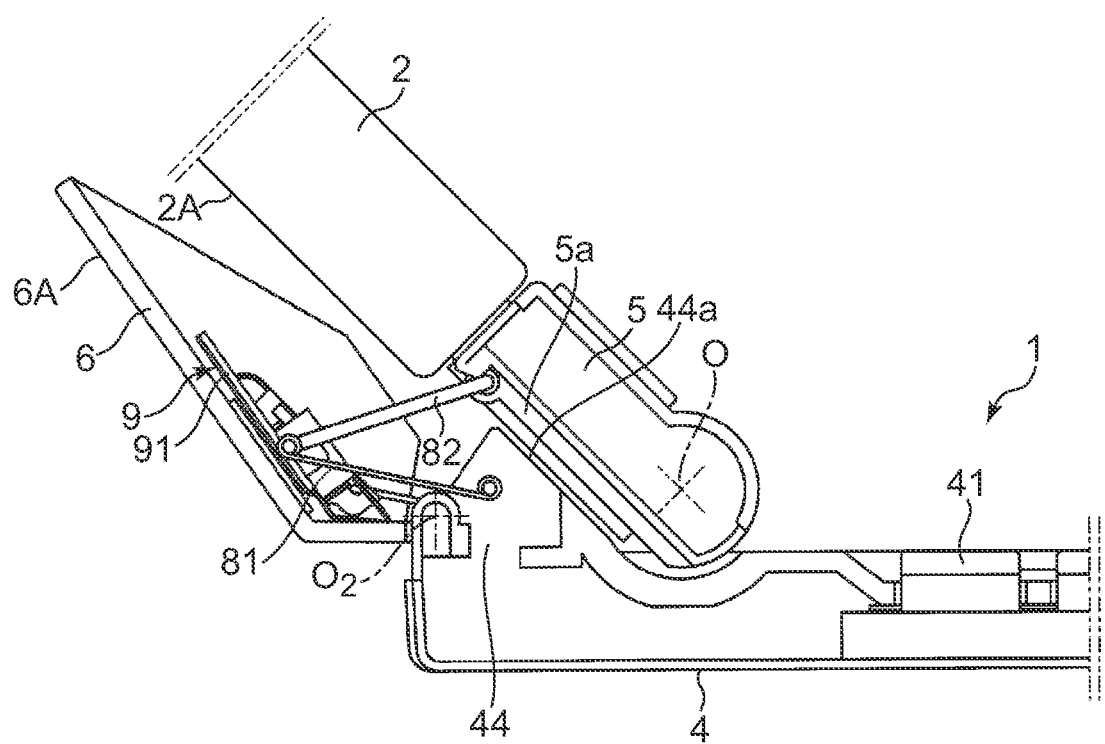
FIG. 7 shows an expanded sectional view illustrating an essential part of the laptop PC illustrated in FIG. 1, and illustrates a state where the opening and closing body is opened by 135 degrees with respect to the base body.
Figure 8:
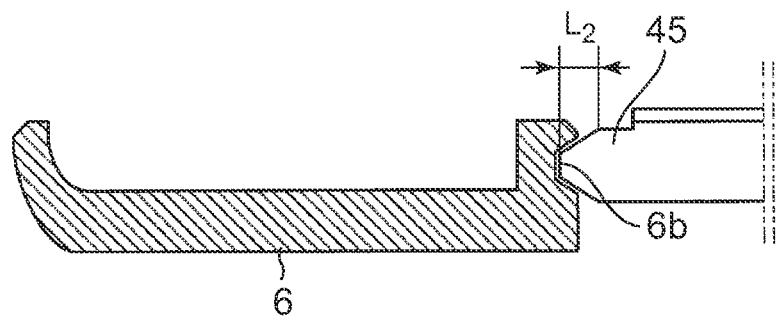
FIG. 8 shows a sectional view illustrating a relationship between a cover and a cover shaft for supporting the cover.
Figure 9:
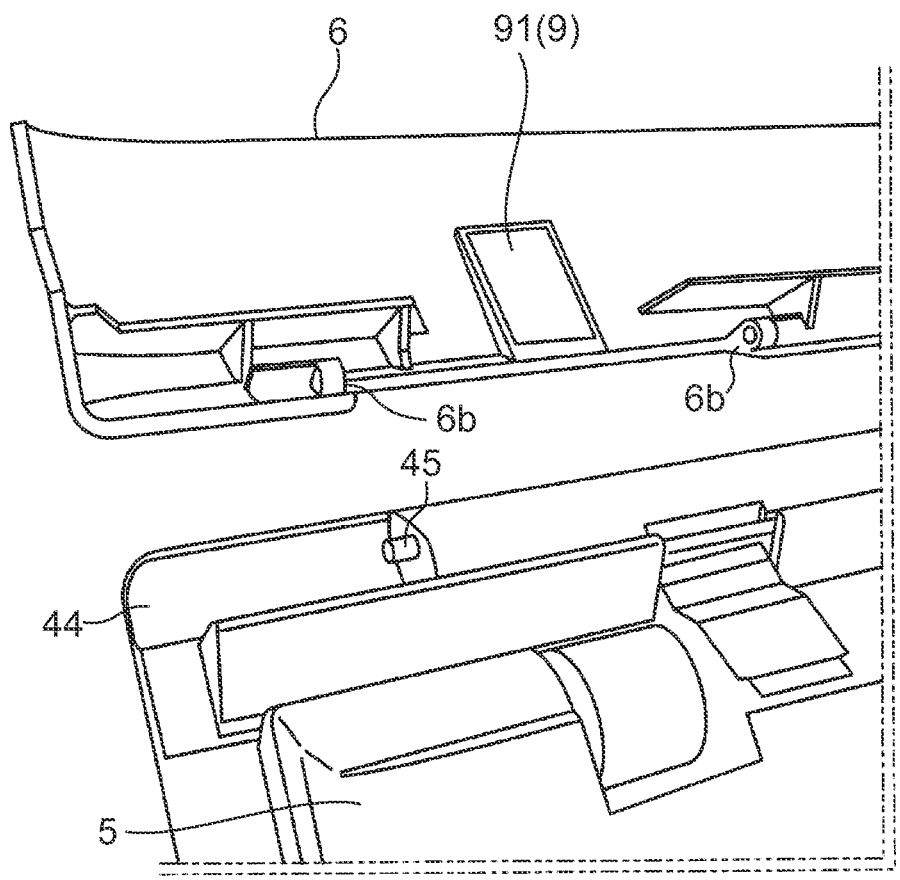
FIG. 9 shows a view illustrating a state where the cover is removed from the cover shaft.

FIG. 8 is a sectional view illustrating a relationship between the cover and a cover shaft for supporting the cover, and FIG. 9 is a view illustrating a state where the cover is removed from the cover shaft. As illustrated in FIG. 8, a shaft hole 6b is formed in the cover 6, so that the cover 6 is supported by a cover shaft 45 (only a "shaft center $O_2$" of the cover shaft is illustrated in FIGS. 4 to 7) provided in a rear edge of the stepped portion 44 provided behind the shaft (see FIG. 4). The cover 6 is hereby openable and closable when the tablet PC 2 is closed with respect to the station body 4. When the cover 6 is closed with respect to the depth portion remaining behind the shaft as illustrated in FIG. 4, the depth portion remaining behind the shaft, namely, the stepped portion 44 and the V-shaped groove G, and the attachment portion 5 are covered, and the outer surface 6A of the cover 6 is placed on the same plane as the outer surface 2A of the tablet PC 2. As a result, the laptop PC 1 according to an embodiment is configured as an electronic device including a cover which is supported behind a shaft, which is openable and closable when an opening and closing body is closed, which is configured such that its outer surface is placed on the same plane as an outer surface of the opening and closing body when the cover is closed, and which covers that depth portion of a base body which remains behind the shaft.

In the meantime, as illustrated in FIG. 8, a fitting margin $L_2$ for the shaft hole 6b provided on the cover 6 and the cover shaft 45 is set so that the cover 6 is removed from the cover shaft 45 when a force of more than a predetermined magnitude works on the cover 6 in a state where the cover 6 is opened (see FIG. 9). A force of the predetermined magnitude is 3 kgf, for example, and in this case, when a force of more than 3 kgf works on the cover 6 in the state where the cover 6 is opened, the cover 6 is removed from the cover shaft 45. Hereby, the laptop PC 1 according to the an embodiment is configured as an electronic device in which a cover is supported by a cover shaft so that the cover is removed from the cover shaft when a force of more than a predetermined magnitude works on the cover in a state where the cover is opened.

Figure 10:
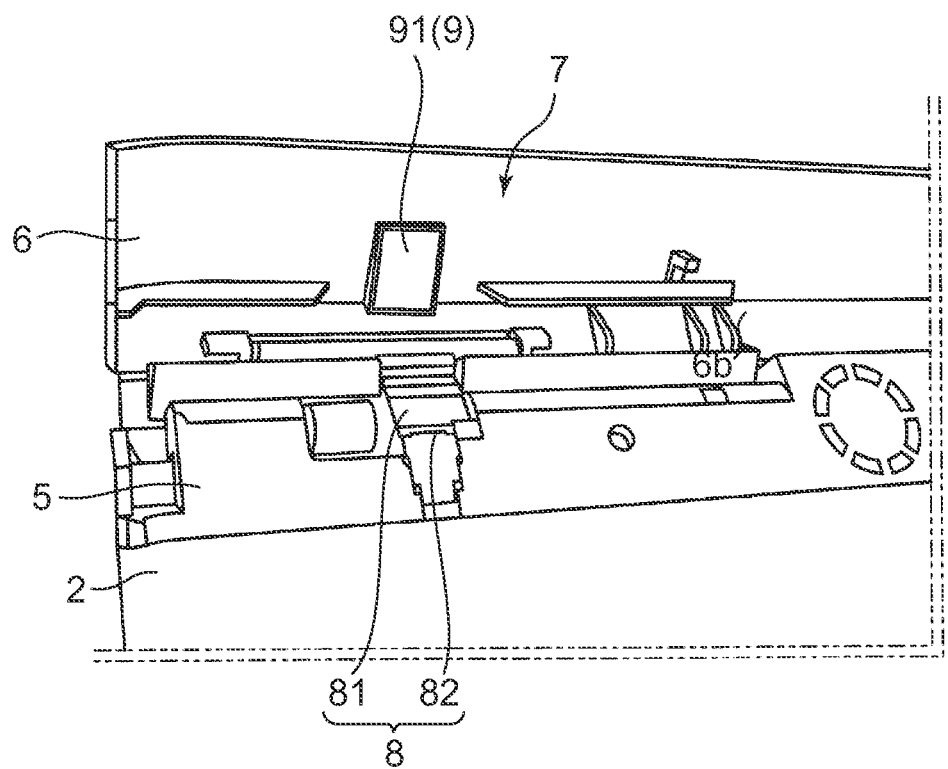
FIG. 10 shows a view illustrating a state where the cover is opened and illustrating an opening and closing mechanism.

FIG. 10 is a view illustrating a state where the cover is opened and illustrating an opening and closing mechanism. As illustrated in FIG. 10, an opening and closing mechanism 7 is provided between the attachment portion 5 and the cover 6. The opening and closing mechanism 7 is configured to open the cover 6 being closed, when the tablet PC 2 is opened from its closed state, and to close the cover 6 being opened, when the tablet PC 2 is closed from its opened state. The opening and closing mechanism 7 includes link mechanisms 8 and connection means 9 at two places in a width direction of the station body 4. Thus, the laptop PC 1 according to an embodiment is configured as an electronic device including an opening and closing mechanism provided between an opening and closing body and a cover, and configured to open the cover being closed, when the opening and closing body is opened from its closed state, and to close the cover being opened, when the opening and closing body is closed from its opened state.

Figure 5:
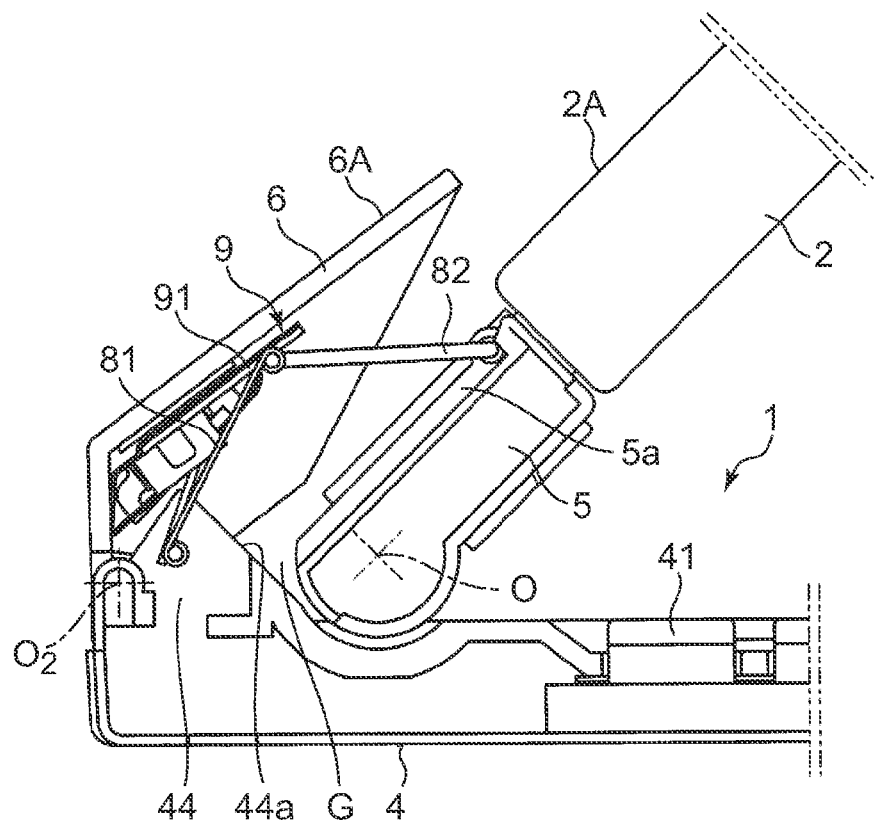
FIG. 5 shows an expanded sectional view illustrating an essential part of the laptop PC illustrated in FIG. 1, and illustrates a state where the opening and closing body is opened by 45 degrees with respect to the base body.

The link mechanism 8 is configured to open the cover 6 being closed, by pressing the cover 6 thus closed, when the tablet PC 2 is opened from the closed state. The link mechanism 8 is constituted by combining one end of a metal tabular body 81 and one end of a metal striped body 82. This allows the tabular body 81 to rotate relative to the striped body 82 and the striped body 82 to rotate relative to the tabular body 81. Further, the other end of the tabular body 81 is supported by the stepped portion 44 provided in the station body 4, and the other end of the striped body 82 is supported by the attachment portion 5. Accordingly, as illustrated in FIG. 4, the one end of the tabular body 81 is accommodated in a recessed portion 5a provided in the attachment portion 5 in a state where the tablet PC 2 is closed, and as illustrated in FIGS. 5 to 7, when the tablet PC 2 is opened from its closed state, the one end of the tabular body 81 projects outside the attachment portion 5 from the recessed portion 5a of the attachment portion 5.

The connection means 9 is configured to close the cover 6 being opened, when the tablet PC 2 is closed from its opened state, and as illustrated in FIG. 10, the connection means 9 is constituted by the tabular body 81 and a magnet 91 provided in the cover 6 at a position opposite to the tabular body 81. Hereby, the magnet 91 provided in the cover 6 adheres to the tabular body 81. When the tablet PC 2 is closed from the opened state, the cover 6 being opened is closed in association with the attachment portion 5.

Figure 11:
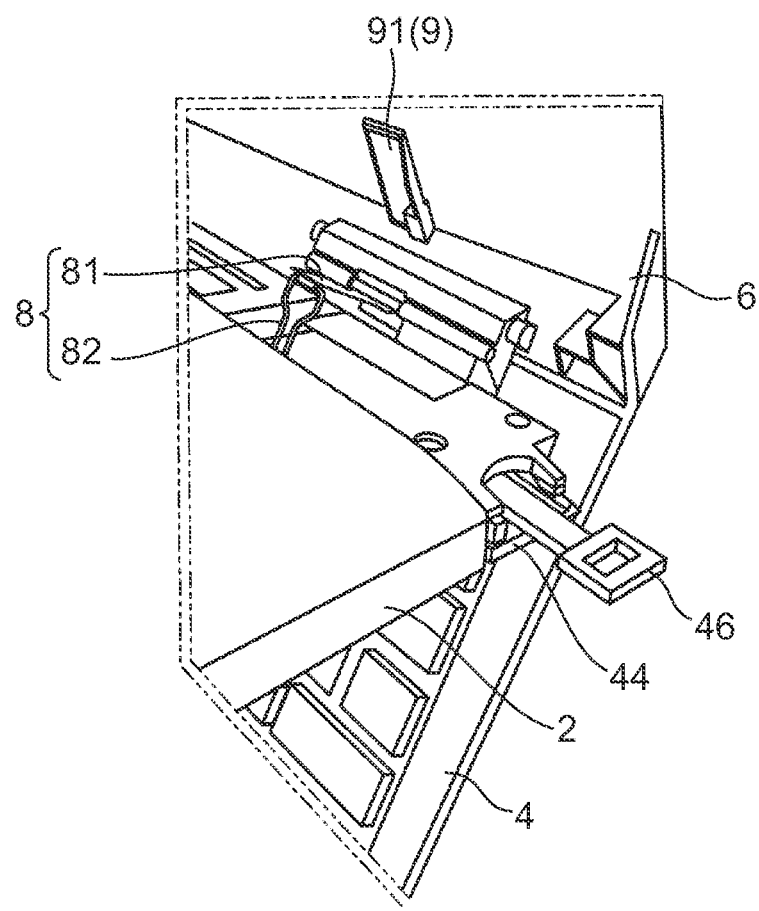
FIG. 11 shows a view illustrating a hitch provided on a right side surface of a stepped portion.

FIG. 11 is a view illustrating a hitch provided on a right side surface of the stepped portion. As illustrated in FIG. 11, a hitch 46 is provided on a right side surface of the stepped portion 44. The hitch 46 is configured to connect a security lock (not shown) thereto. The hitch 46 is drawable in a state where the cover 6 is opened, and the cover 6 is closable in a state where the hitch 46 is drawn.

As illustrated in FIG. 4, the laptop PC 1 according to the aforementioned embodiment is configured such that the cover 6 is closed in association with a closing operation on the tablet PC 2. More specifically, the one end of the tabular body 81 constituting the link mechanism 8 is accommodated in the recessed portion 5a of the attachment portion 5 from outside the attachment portion 5 by the closing operation on the tablet PC 2, and in association with this, the cover 6 is moved from an open position to a closed position in a state where the magnet 91 provided in the cover 6 adheres to the one end of the tabular body 81. Hereby, the cover 6 is closed when the tablet PC 2 is closed with respect to the station body 4. At this time, the depth portion of the station body 4 which depth portion remains behind the shaft for supporting the attachment portion 5 to which the tablet PC 2 is attached, namely, the stepped portion 44 and the V-shaped groove G, and the attachment portion 5 are covered, and the outer surface 6A of the cover 6 is placed on the same plane as the outer surface 2A of the tablet PC 2.

Thus, the cover 6 is independently openable and closable in a state where the tablet PC 2 is closed with respect to the station body 4, and when an open operation is performed on the cover 6 against an attractive force of the magnet 91 provided in the cover 6 with respect to the tabular body 81, the cover 6 is openable independently. This allows the hitch 46 to be drawable as illustrated in FIG. 11, and when the hitch 46 is drawn, the security lock is connectable.

Further, as illustrated in FIG. 9, in a case where a force of more than the predetermined force works on the cover 6 in a state where the cover 6 is opened, the shaft hole 6b provided in the cover 6 is removed from the cover shaft 45, so that the cover 6 is removed from the stepped portion 44 of the station body 4.

Meanwhile, as illustrated in FIGS. 5 to 7, the cover 6 is opened in association with an open operation of the tablet PC 2. More specifically, by the open operation on the tablet PC 2, the one end of the tabular body 81 constituting the link mechanism 8 projects outside the attachment portion 5 from the recessed portion 5a of the attachment portion 5. In association with this, the one end of the tabular body 81 presses the magnet 91 provided in the cover 6, and in a state where the magnet 91 provided in the cover 6 adheres to the one end of the tabular body 81, the one end of the tabular body 81 presses the cover 6 (the magnet 91 provided in the cover 6), so that the cover 6 is moved from the closed position to the open position. Hereby, the cover 6 is opened when the tablet PC 2 is opened with respect to the station body 4.

The laptop PC 1 according to the aforementioned embodiment includes the cover 6 which is supported behind the shaft, which is openable and closable when the tablet PC 2 is closed, which is configured such that its outer surface is placed on the same plane as the outer surface 2A of the tablet PC 2 when the cover is closed, and which covers the depth portion of the station body 4 which depth portion remains behind the shaft, namely, the stepped portion 44 and the V-shaped groove G, and the attachment portion 5. Accordingly, this improves an appearance at the time of closing the tablet PC 2 of the laptop PC 1 in which the shaft is placed on the station body 4.

Further, when a force of more than a predetermined force works on the cover 6 in a state where the cover 6 is opened, the cover 6 is removed from the cover shaft 45. In view of this, even if an excessive force works on the cover 6, the cover made from resin cannot be broken.

Further, the laptop PC 1 includes the opening and closing mechanism 7 configured to open the cover 6 being closed, when the tablet PC 2 is opened from its closed state, and to close the cover 6 being opened, when the tablet PC 2 is closed from its opened state. Accordingly, it is not necessary to perform an open operation on the cover 6 independently from an open operation on the tablet PC 2, and it is not necessary to perform a closing operation on the cover 6 independently from a closing operation on the tablet PC 2.

The laptop PC 1 according to the aforementioned embodiment is configured such that the tablet PC 2 is attached to the station 3. However, the laptop PC 1 may be an electronic device in which a shaft for supporting an opening and closing body is placed on a base body so that a depth of the base body remains behind the shaft, and may be, for example, a laptop PC in which a shaft for supporting a cover body is placed on a main body of the PC so that a depth of the main body of the PC remains behind the shaft.

Further, the laptop PC 1 according to the aforementioned embodiment is configured such that the connection means 9 is constituted by the metal tabular body 81 constituting the link mechanism 8, and the magnet 91 provided in the cover 6 so as to be opposed to the tabular body 81. However, the laptop PC 1 may be constituted, for example, by attaching, around the cover shaft, a torsion coiled spring which always biases the cover 6 in a closing direction.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
a detachable display portion;
a base body;
the base body including an attachment portion to which the detachable display portion attaches;
the attachment portion being located a depth from a rear edge of the base body; and
a cover, coupled to the base body, extending from a point of the base body behind the attachment portion and proximate to the rear edge of the base body.

2. The electronic device of claim 1, wherein the cover is openable and closable when the detachable display portion is opened and closed such that an outer surface of the cover is placed on the same plane as an outer surface of the detachable display portion when the detachable display portion and the base body are closed together.

3. The electronic device of claim 1, wherein the cover covers the depth from a rear edge of the base body when the detachable display portion and the base body are closed together.

4. The electronic device of claim 1, wherein the base body includes a processor, a memory and a keyboard.

5. The electronic device of claim 4, wherein the detachable display portion is a tablet device.

6. An electronic device, comprising:
a base body that contains a shaft for attaching to a detachable display portion, wherein a depth of the base body remains behind the shaft; and
an opening and closing body with an outer surface that is attached to the base body;
wherein the shaft supports the opening and closing body to allow it to be openable and closable with respect to the base body; and
wherein the opening and closing body covers the depth of the base body and remains behind the shaft when the shaft is in a closed position with respect to the base body.

7. The electronic device of claim 6, wherein the opening and closing body is openable and closable when the detachable display portion is opened and closed such that an outer surface of the opening and closing body is placed on the same plane as an outer surface of the detachable display portion when the detachable display portion and the base body are closed together.

8. The electronic device of claim 6, wherein the base body includes a processor, a memory and a keyboard.

9. The electronic device of claim 6, wherein the shaft is an attachment portion for the detachable display portion in the form of a tablet device.

10. An electronic device, comprising:
a base body that contains a movable shaft for attaching to a detachable tablet portion, wherein a depth of the base body remains behind the shaft; and
a cover that attaches to the base body and transitions when the shaft is moved;
wherein the base body contains a stepped portion between the shaft and a rear edge of the base body accommodating opening and closing of the shaft with respect to the base body; and
wherein the cover is positioned and shaped to cover the rear edge of the base body when the shaft is closed with respect to the base body.

* * * * *